F. D. HOWE.
BRAKE.
APPLICATION FILED AUG. 18, 1916.
1,295,506.
Patented Feb. 25, 1919.
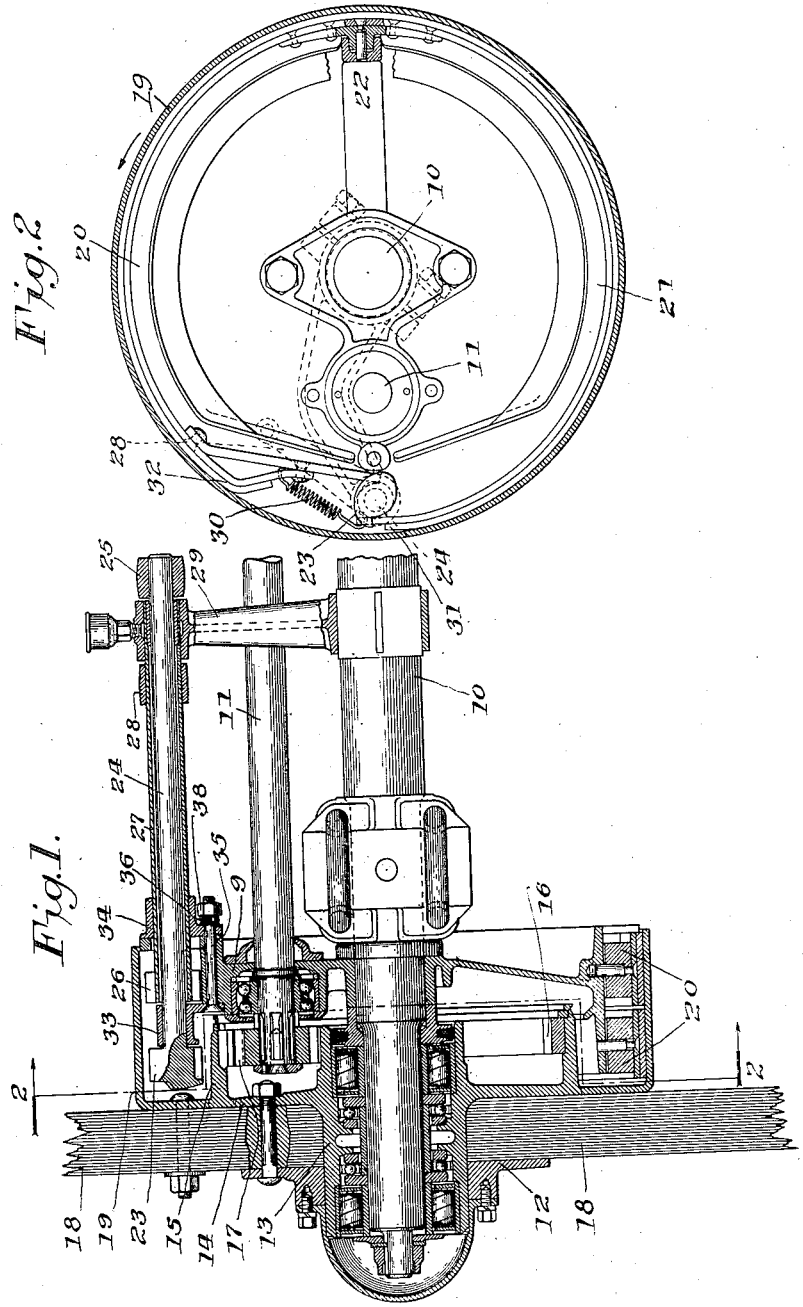
Inventor.
Frank D. Howe,
By Chas. E. Lord
Atty.

UNITED STATES PATENT OFFICE.

FRANK D. HOWE, OF AKRON, OHIO, ASSIGNOR, BY MESNE ASSIGNMENTS, TO INTERNATIONAL HARVESTER COMPANY, A CORPORATION OF NEW JERSEY.

BRAKE.

1,295,506.  Specification of Letters Patent.  Patented Feb. 25, 1919.

Application filed August 18, 1916. Serial No. 115,656.

*To all whom it may concern:*

Be it known that I, FRANK D. HOWE, a citizen of the United States, residing at Akron, in the county of Summit and State of Ohio, have invented certain new and useful Improvements in Brakes, of which the following is a full, clear, and exact specification.

This invention relates to brakes.

One of the objects of my invention is to improve means for equalizing the braking effort exerted by a plurality of brake shoes.

Another object is to compensate in a novel manner for wear on coöperating braking members.

Another object of my invention is to provide improved means for automatically equalizing the braking action of a plurality of brake shoes in a manner to meet all the requirements for successful commercial operation.

These and other objects are accomplished by providing, in combination with a rotating brake element and stationary brake elements associated therewith, means for automatically compensating for the wear of one or the other of the brake elements and for equalizing the braking effort exerted by a plurality of said relatively stationary brake elements against the moving brake element.

The invention is illustrated on the accompanying sheet of drawings, in which—

Figure 1 is a fragmentary plan view, parts being in section, of a rear axle construction and traction wheel embodying my invention; and Fig. 2 is a fragmentary side elevation and section of the same parts, the section being taken along the line 2—2 of Fig. 1.

The various novel features of my invention will be apparent from the following description and drawings, and will be particularly set forth in the appended claims.

I have chosen to illustrate my invention in connection with the rear axle construction of a motor vehicle including a dead axle 10 and live axle 11. Mounted in any approved manner upon the ends of the dead axle 10 are traction wheels 12 (only one being shown), including a hub 13 provided with an integrally formed vertical portion 14 terminating in a laterally extending flange 15, to which may be secured, or with which may be integrally formed, an internal gear wheel 16, which is driven by a pinion 17 mounted upon one end of the live axle 11. The outer end of the live axle 11 passes through an opening in a supporting plate 9, which is secured to the dead axle 10. Preferably secured to the spokes 18 of the wheel is a brake flange 19 which rotates with the wheel. Adapted to engage the inner surface of this brake flange 19 for braking purposes are two sets of brake shoes, which are arranged side by side. Each set includes two similarly arranged flexible brake shoes 20 and 21, each pivotally connected at approximately its mid-circumference to a suitable support 22. The outer set of brake shoes is forced into engagement with the rotary braking surface 19 by a cam 23 mounted on or formed integral with one end of a shaft 24, which is rocked in any suitable manner by an arm 25. The inner set of brake shoes is forced into engagement with the rotary braking element 19 by a second cam 26 mounted upon one end of a tubular shaft 27 surrounding the shaft 24 and having a similar arm 28 by which the tubular shaft 27 and cam 26 may be rocked. One end of each of the shafts 24 and 27 is suitably supported in a bracket 29 secured to and extending from the dead axle 10. Springs 30 connect the free ends of the brake shoes 20 and 21, tending to hold the same out of engagement with the rotary brake member 19.

It is a well-known fact that when the brake shoes are applied against the rotating element that different parts of each of the shoes of a single set exert pressures which differ from each other. For instance, reference being had to Fig. 2, let it be assumed that the brake flange 19 is rotating in a counterclockwise direction, as indicated by the arrow, and that the brake shoes 20 and 21 are applied to the flange 19. It will be appreciated that there will be a greater pressure between the tip or free end 31 of the brake shoe 21 and the brake flange 19 than there will be between the free end 32 of the brake shoe 20 and the brake flange 19. This being true, the friction material on the free end 31 of the brake shoe 21 will wear away more rapidly than the friction material at the free end 32 of the brake shoe 20. This means that the longer the brake shoes are in active service the more will be the difference in the wearing away of the friction material at the free ends of these brake shoes. Eventually, due to the unequal wearing of the friction material in the brake shoes, the brake shoe 21 will be unable to share its proportion of the braking effort. Heretofore, under these conditions, it has been necessary to either reset the brake shoes or provide them with new friction material. However, I have provided means for automatically compensating for the wear and for equalizing the braking effort of the brake shoes against the rotary brake flange 19. This means includes two bearing members 33 and 34, in which the cam shafts 24 and 27 are journaled, and through which said shafts extend. These bearing members 33 and 34 are pivotally connected to the stationary supporting plate 9 by a bolt 35 so that the bearing members 33 and 34 may swing to one side or the other about the bolt 35 as a pivot. This being true, the cams 23 and 26 likewise may be shifted laterally to one side or the other about the bolt 35 as a pivot. In this manner it is evident that even though the frictional material on the brake shoes has worn unevenly, the cam members, by being swung laterally, may compensate for this wear and cause the shoes to exert equalized pressures upon the brake flange, whereby each of the brake shoes will take its proportionate amount of braking effort when applied against this rotary brake member 19. Furthermore, this equalizing and compensating action takes place automatically, in accordance with the amount of wear, through the yielding action of a coiled spring 36 which is mounted upon and surrounds one portion of the bolt 35 and which is clamped between the bearing member 34 and a nut 38 which coöperates with the threaded end of the bolt 35.

The cams 23 and 26 are given their initial adjusted position by first applying the brake shoes to the braking member 19 and then drawing up the nut 38 the desired degree to make the spring action as stiff or yieldable as may be wished. The brake shoes may then be released and the braking mechanism is ready for regular operation. Any unequal wearing of the friction material in the brake shoes will now be taken up automatically by a lateral movement of the bearing members 33 and 34, and accordingly lateral movement of the cams 23 and 26, the lateral movement of these parts being yieldably permitted by the spring 36. In this connection it is to be noted that within certain limits the cam members 23 and 26 may shift laterally independently of each other due to the fact that the bearing members 33 and 34 are independently mounted upon the bolt 35. Therefore, if the brake shoes or the friction material in the brake shoes of different sets should wear unequally, there will still be proper compensating action between the brake shoes of one set whether or not compensating action between the brake shoes of the other set is necessary at that time.

It is evident that there may be various modifications of my invention as herein particularly shown and described, and it is my intention to cover all such modifications which do not involve a departure from the spirit and scope of my invention as set forth in the following claims.

What I claim as my invention, and desire to secure by Letters Patent, is:

1. In brake mechanism, the combination of a movable brake member, a brake member coöperating therewith, means for moving one of said brake members into engagement with the other, and pivotally mounted wear compensating means associated with the aforesaid means.

2. In brake mechanism, the combination of coöperating brake members which retard movement by frictional engagement, and yieldably and pivotally mounted means for automatically compensating for the wear of said brake members.

3. In brake mechanism, the combination of coöperating brake members including a drum, a brake band and a cam which retard movement by frictional engagement, and means including a single resilient member for automatically compensating for the wear of said brake members and for holding said brake band in contact with said cam.

4. In brake mechanism, the combination of a movable brake member, a brake member coöperating therewith, means for moving one of said brake members into engagement with the other, and a pivotally mounted member to which said means is connected for adjusting said means to compensate for wear of the brake members.

5. In brake mechanism, the combination of a movable brake member, a brake member coöperating therewith, means for moving one of said brake members into engagement with the other, a movably mounted member to which said means is connected for adjusting said means to compensate for wear of the brake members, and a single spring for yieldingly holding said movably mounted member in a given position.

6. In brake mechanism, the combination of a movable brake member, a brake member coöperating therewith, a cam for moving one of said brake members into engagement with the other, and pivotal means whereby said cam may be shifted automatically to compensate for the wear of said brake members.

7. In brake mechanism, the combination of a movable brake member, a brake member coöperating therewith, a cam for moving one of said brake members into engagement with the other, an actuating shaft for said cam, and a pivotally mounted bearing member for said shaft whereby said cam may be adjusted.

8. In brake mechanism, the combination of a movable brake member, a brake member coöperating therewith, a cam for moving one of said brake members into engagement with the other, an actuating shaft for said cam, a pivotally mounted bearing member for said shaft whereby said cam may be adjusted, and means for yieldingly holding said bearing member in a given position.

9. In brake mechanism, the combination of a movable brake member, a plurality of brake members coöperating therewith, a cam for moving said last mentioned brake members into engagement with the movable brake member, a pivotally mounted bearing by which said cam is supported whereby said cam may be adjusted in accordance with unequal wearing of said brake members, and resilient means for yieldingly holding said cam member in a given position.

10. In brake mechanism, the combination of a movable brake member, a plurality of brake members coöperating therewith, a cam for moving said last mentioned brake members into engagement with the movable brake member, a shaft upon which said cam is mounted, a bearing for said shaft, a pivot upon which said bearing is pivotally mounted to permit lateral movement of said cam to compensate for wear of said brake members, and a spring held on said pivot for yieldingly retaining the cam member in adjusted position.

11. In brake mechanism, the combination of a brake member, two laterally arranged relatively stationary brake members coöperating therewith, means for moving each of said relatively stationary brake members into frictional engagement with said movable brake member, and pivotally mounted means whereby wear between said movable brake member and either one of the other brake members may be automatically compensated for independent of the other.

12. In brake mechanism, the combination of a movable brake member, two laterally arranged relatively stationary brake members, two cams for respectively pressing said relatively stationary brake members into engagement with said movable brake member, shafts upon which said cams are mounted, and pivotally mounted bearing members for said shafts by means of which the cams may be adjusted in accordance with the wear of said brake members.

13. In brake mechanism, the combination of a movable brake member, two laterally arranged relatively stationary brake members, two cams for respectively pressing said relatively stationary brake members into engagement with said movable brake member, concentrically arranged shafts upon which said cams are mounted, and pivotally mounted bearing members for said shafts by means of which the cams may be adjusted in accordance with the wear of said brake members.

14. A shaft mounting consisting of a frame, a shaft bearing carried thereby, a shaft in the bearing, and means for permitting pivotal movement of the shaft and bearing relatively to said frame.

15. In a brake mechanism, the combination of a movable brake member, a plurality of brake members associated therewith, means for applying said brake members embodying a shaft and a sleeve movable thereon, and yieldable means whereby said shaft may be shifted to compensate for wear.

16. In a brake mechanism, the combination of a movable brake member, a plurality of brake members associated therewith, a shaft and a sleeve movably mounted on the shaft, each carrying a means for operating said brake member, and means for adjusting said last mentioned means to compensate for wear.

In testimony whereof I affix my signature.

FRANK D. HOWE.